US011012171B2

(12) United States Patent
Stephansen et al.

(10) Patent No.: US 11,012,171 B2
(45) Date of Patent: May 18, 2021

(54) DETERMINISTIC RE-MULTIPLEXING FOR DVB SFN NETWORKS

(71) Applicant: Nevion AS, Lysaker (NO)

(72) Inventors: Helge Stephansen, Fetsund (NO); Bjørn Tommy Jensen, Haslum (NO); Anders Dale, Lysaker (NO)

(73) Assignee: Nevion AS, Lysaker (NO)

( * ) Notice: Subject to any disclaimer, the term of this patent is extended or adjusted under 35 U.S.C. 154(b) by 0 days.

(21) Appl. No.: 16/310,706

(22) PCT Filed: Jun. 17, 2016

(86) PCT No.: PCT/EP2016/064106
§ 371 (c)(1),
(2) Date: Dec. 17, 2018

(87) PCT Pub. No.: WO2017/215769
PCT Pub. Date: Dec. 21, 2017

(65) Prior Publication Data
US 2019/0327008 A1 Oct. 24, 2019

(51) Int. Cl.
*H04H 20/18* (2008.01)
*H04H 20/67* (2008.01)
(Continued)

(52) U.S. Cl.
CPC ............ *H04H 20/18* (2013.01); *H04H 20/67* (2013.01); *H04H 20/95* (2013.01);
(Continued)

(58) Field of Classification Search
CPC ... H04L 65/4069; H04L 65/80; H04L 65/607; H04L 67/02; H04L 65/4076;
(Continued)

(56) References Cited

U.S. PATENT DOCUMENTS 10,244,277 B2 * 3/2019 Peng .................... H04N 21/643
2014/0298397 A1 * 10/2014 Pichot ............... H04N 21/2221
725/116

FOREIGN PATENT DOCUMENTS

WO 2010-043498 A1 4/2010
WO 2012-116743 A1 9/2012

OTHER PUBLICATIONS

International Search Report issued in Application No. PCT/EP2016/064106, dated Nov. 30, 2016 (6 pages).
(Continued)

*Primary Examiner* — Jungwon Chang
(74) *Attorney, Agent, or Firm* — Osha Bergman Watanabe & Burton LLP

(57) ABSTRACT

A method for adding Time Marker Packets, TMPs, comprising Metadata to an MPEG-2 transport stream transmitted via a broadcast network for providing a deterministic transport stream, comprising providing feeds of data from at least one source, where the feeds comprise payload packets being referenced by a common 1 PPS reference, and where the feeds are input to at least one multiplexer, MUX; providing Time Marker Packets, TMPs, as input to each multiplexer, where each TMP comprises a plurality of time stamps per second measured relative to said 1 PPS reference, and each TMP has a value representing an Absolute Program Clock Reference, APCR, at the time of transmission, where the APCR is based on the Epoch time, and where the TMP packet further comprises PCR, OPCR locked to said 1 PPS and UTC leap seconds. The invention is further defined by a device for executing said method, as well as a method for coding a deterministic transport stream in a Single Frequency Network, SFN, and a device for executing this method.

11 Claims, 7 Drawing Sheets

(51) Int. Cl.
*H04H 20/95* (2008.01)
*H04N 21/236* (2011.01)
*H04N 21/60* (2011.01)
*H04L 29/06* (2006.01)
*H04L 12/26* (2006.01)

(52) U.S. Cl.
CPC ....... *H04N 21/23608* (2013.01); *H04N 21/60* (2013.01); *H04L 43/106* (2013.01); *H04L 65/4069* (2013.01); *H04L 65/4076* (2013.01)

(58) Field of Classification Search
CPC ................ H04L 43/106; H04N 21/643; H04N 21/2221; H04N 21/23608; H04N 21/242; H04N 21/60; H04H 20/18; H04H 20/67; H04H 20/95
See application file for complete search history.

(56) References Cited

OTHER PUBLICATIONS

Written Opinion issued in International Application No. PCT/EP2016/064106, dated Nov. 30, 2018 (6 pages).
International Preliminary Report on Patentability issued in Application No. PCT/EP2016/064106, dated Oct. 1, 2018 (33 pages).
"Digital Video Broadcasting (DVB); Modulator Interface (T2-MI) for a second generation digital terrestrial television broadcasting system (DVB-T2)", Technichal Specification, European Telecommunications Standards Institute (ETSI), 650, Route Des Lucioles; F-06921 Sophia-Antipolis; France, vol. Broadcas, No. V1.2.1, Dec. 1, 2010, XP014061858, p. 36, line 1-p. 40, last line; p. 44, line 1-p. 44, last line (48 pages).

\* cited by examiner

DETERMINISTIC RE-MULTIPLEXING FOR DVB SFN NETWORKS

TECHNICAL FIELD

The present invention relates to a method for deterministic re-multiplexing of transport streams, aimed at SFN regions in DVB networks.

BACKGROUND

A Single Frequency Network (SFN) is a broadcasting network where several transmitters simultaneously send the same signal at the same time over the same frequency channel in the same geographical area. Use of SFN may increase the coverage area and decrease the outage probability in comparison to use of Multi Frequency Networks. However, the main driver for SFN operation is to achieve the digital dividend as the strong demand for more frequencies for mobile phone force authorities to allocate traditional broadcast frequency for mobile phone operations.

In an SFN region, it is crucial that all transmitters are fed with exactly same bit stream. Everything from packet sequence to Program Clock Reference (PCR) stamps need to be identical, bit-by-bit. The invention is designed so that the re-multiplexing process, i.e. SFN adaptation, becomes fully deterministic, enabling a set of geographically distributed multiplexers to produce exactly same output stream when fed with the same input signals and the same configuration settings.

REFERENCES

[1]: ISO/IEC 13818-1:2015 Information technology—Generic coding of moving pictures and associated audio information—Part 1: Systems.
[2]: ETSI EN 302 755 v.1.4.1; Digital Video Broadcasting (DVB); Framing structure, channel coding and modulation for a second-generation digital terrestrial television broadcasting system (DVB-T2).
[3]: ETSI TS 102 773 v.1.3.1; Digital Video Broadcasting (DVB); Modulator Interface (T2-MI) for a second-generation digital terrestrial television broadcasting system (DVB-T2).
[4]: Draft ETSI; TS 102 292 1.1.1 Digital Video Broadcasting (DVB); Structure and modulation of optional transmitter signatures (T2-TX-SIG) for use with the DVB-T2 second generation digital terrestrial television broadcasting system.
[5]: ETSI EN 300 744. Digital Video Broadcasting (DVB); Framing structure, channel coding and modulation for digital terrestrial television.
[6]: ETSI TS 101 191. [7] Digital Video Broadcasting (DVB); DVB mega-frame for Single Frequency Network (SFN) synchronisation.
[7]: ETSI EN 300 468: Digital Video Broadcasting (DVB); Specification for Service Information (SI) in DVB Systems.
[8]: 1588-2008—IEEE Standard for a Precision Clock Synchronization Protocol for Networked Measurement and Control Systems.

The invention makes it possible to use a common satellite feed to distribute transport streams to both end users (Direct to Home, DTH) and to SFN regions in a terrestrial network, thus significantly reducing the distribution cost. Focus has been put on keeping the overall system complexity as low as possible.

The principles related to the present invention are suitable for any kind of similar system where identical outputs are needed. Ref. 1-5.

BRIEF DESCRIPTION OF THE INVENTION

The invention is defined by a method for adding Time Marker Packets, TMPs, comprising Metadata to an MPEG-2 transport stream transmitted via a broadcast network for providing a deterministic transport stream, comprising:
  providing feeds of data from at least one source, where the feeds comprise payload packets being referenced by a common 1 PPS reference, and where the feeds are input to at least one multiplexer, MUX;
  providing Time Marker Packets, TMPs, as input to each multiplexer, where each TMP comprises a plurality of time stamps per second measured relative to said 1 PPS reference, and each TMP has a value representing an Absolute Program Clock Reference, APCR, at the time of transmission, where the APCR is based on the Epoch time, and where the TMP packet further comprises PCR, OPCR locked to said 1 PPS and UTC leap seconds.

The invention is further defined by a method for coding a deterministic transport stream in a Single Frequency Network, SFN, comprising:
  receiving at least one multiplexed transport stream comprising TMP packets on input of a deterministic re multiplexer, where each TMP comprises a plurality of time stamps per second measured relative to said 1 PPS reference, and each TMP has a value representing an Absolute Program Clock Reference, APCR, at the time of transmission, where the APCR is based on the Epoch time, and where the TMP packet further comprises PCR, OPCR locked to said 1 PPS, Estimated Transmission Time (ETT) and UTC leap seconds;
  receiving MUX configuration data enabling the MUX to calculate the length of the SFN-frame;
  extracting timing information from each TMP and deterministically generating SFN Time stamps based on UTC, the length of an SFN-frame, Estimated Transmission Time and using the Absolute Program Clock Reference, APCR, as a time base for calculation of the departure time of the first packet in the SFN-Frame
  tagging each packet slot in the SFN-frame with a departure time stamp, DTS, based on its position in the SFN-frame;
  tagging each received packet with an Absolute Time Stamp, ATS, based on its position relative to the APCR packet arrived before and after each packet, and
  producing compliant and fully deterministic output streams of data with payload packets for SFN modulators by selecting packets from at least one multiplexed transport stream received, and where the selected packets are placed in order from low to high ATS.

Other features of the invention are defined in the dependent claims.

BRIEF DESCRIPTION OF THE DRAWINGS

The invention is described in detail with reference to the following drawings.

DETAILED DESCRIPTION

Figure 1:
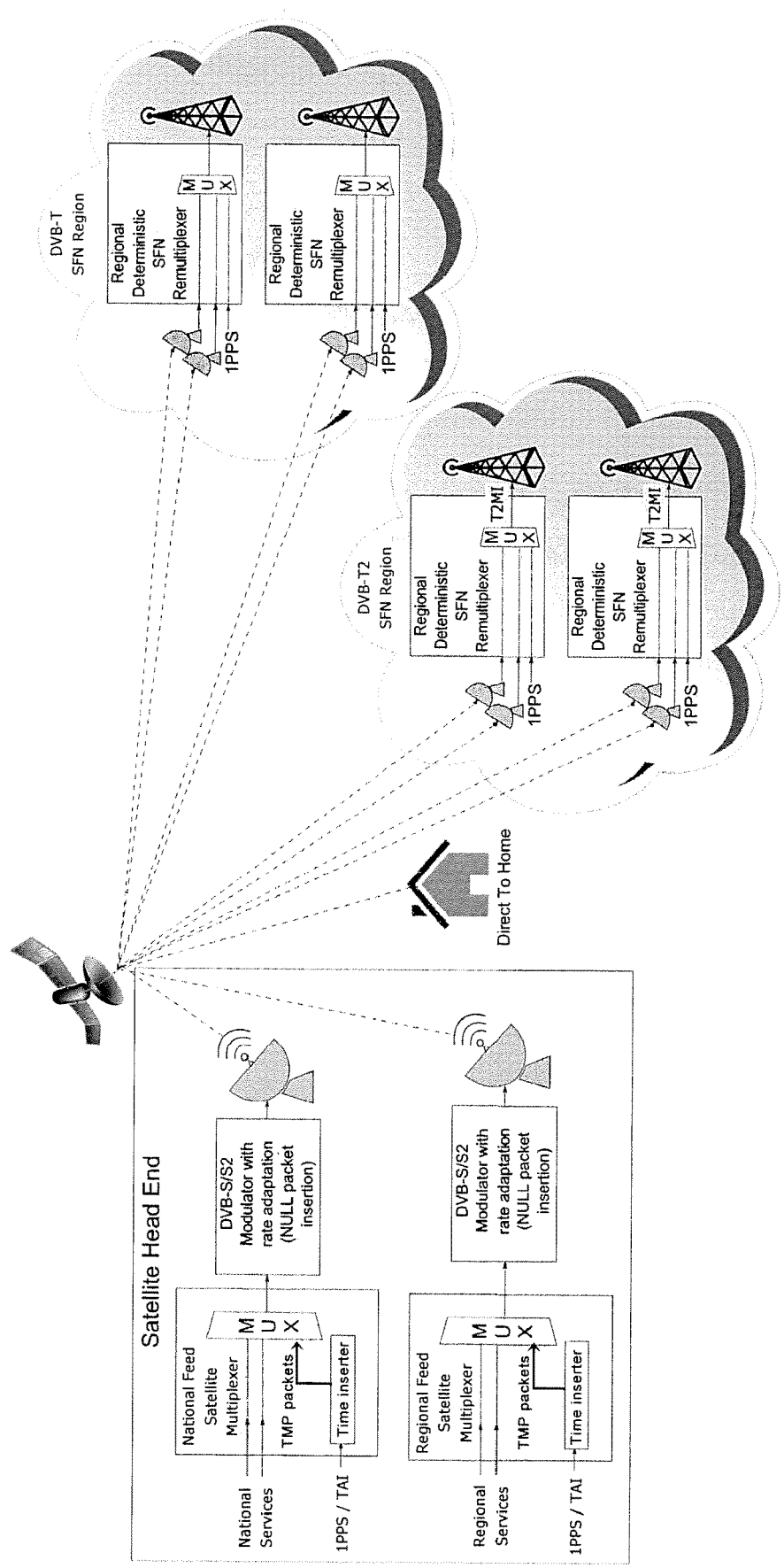
FIG. 1 shows a system overview of the deterministic SFN re-multiplexing.

The object of the present invention is to perform deterministic re-multiplexing of transport streams in Single Frequency Networks (SFN) using a common satellite feed for distributing transport streams to both end users (Direct to Home, DTH) and to SFN regions in a terrestrial network while keeping the overall system complexity as low as possible.

The invention is defined by a method for adding Time Marker Packets, TMPs, comprising Metadata to an MPEG-2 transport stream transmitted via a broadcast network for providing a deterministic transport stream. The method comprises:

providing feeds of data from at least one source, where the feeds comprise payload packets being referenced by a common 1 PPS reference, and where the feeds are input to at least one multiplexer, MUX;

providing Time Marker Packets, TMPs, as input to each multiplexer, where each TMP comprises a plurality of time stamps per second measured relative to said 1 PPS reference, and each TMP has a value representing an Absolute Program Clock Reference, APCR, at the time of transmission, where the APCR is based on the Epoch time, and where the TMP packet further comprises PCR, OPCR locked to said 1 PPS and UTC leap seconds.

In one embodiment the APCR uses a 27 MHz clock for program clock reference. In another embodiment, the APCR uses the PCR 27 MHz clock for program clock reference, and the PCR is locked to 1 PPS with Epoch Y2K.

In one embodiment the method according, said TMP is sent between 20 to 40 times per second.

For a DVB-T system, letting each said MUX generate Mega-frames with the payload packets, where each Megaframe comprises a Mega-frame Initialisation Packet content, MIP, based on the duration of each SFN-frame, UTC and said TMP.

For a DVB-T2 system, letting each said MUX generate DVB-T2 time stamp content, based on the duration of each T2-frame, UTC and said TMP.

Said above defined embodiments of the inventive method for providing feeds of data are implemented in a device executing the method, where the device is located at a transmitter site.

The invention is further defined by a method for coding a deterministic transport stream in a Single Frequency Network, SFN, comprising:

receiving at least one multiplexed transport stream comprising TMP packets on input of a deterministic re-multiplexer, where each TMP comprises a plurality of time stamps per second measured relative to said 1 PPS reference, and each TMP has a value representing an Absolute Program Clock Reference, APCR, at the time of transmission, where the APCR is based on the Epoch time, and where the TMP packet further comprises PCR, OPCR locked to said 1 PPS, Estimated Transmission Time (ETT) and UTC leap seconds;

receiving MUX configuration data enabling the MUX to calculate the length of the SFN-frame;

extracting timing information from each TMP and deterministically generating SFN Time stamps, based on UTC, the length of an SFN-frame, Estimated Transmission Time and using the Absolute Program Clock Reference, APCR, as a time base for calculation of the departure time of the first packet in the SFN-Frame tagging each packet slot in the SFN-frame with a departure time stamp, DTS, based on its position in the SFN-frame;

tagging each received packet with an arrival time stamp, ATS, based on its position relative to the APCR packet arrived before and after each packet, and producing compliant and fully deterministic output streams of data with payload packets for SFN modulators by selecting packets from at least one multiplexed transport stream received, and where the selected packets are placed in order from low to high ATS.

In one embodiment of the method defined above, the position of data packets in a mega-frame is calculated based on incremental increase from the first data packet in the mega-frame, and where a null packet is inserted in an output packet position if there are no packets for which the arrival time stamp is less the departure time stamp for that position.

In one embodiment, for a DVB-T system, each said multiplexer generate Mega-frames with the payload packets, where each Mega-frame comprises a Mega-frame Initialisation Packet content, MIP, based on the duration of each SFN-frame, UTC (APCR), ETT and said TMP.

In one embodiment, for a DVB-T2 system, each said multiplexer generate DVB-T2 time stamp content, based on the duration of each T2-frame and the TMP comprising UTC (APCR), ETT and said TMP.

In another embodiment, additional packets are inserted in the output transport stream over a period of time, and where these packets are coming from other sources and where the arrival time of these packets are generated in such a way that the number of packets is an integer number of 16 packets, and where the start and stop time of the period is referenced to the APCR clock and where multiple periods of same duration may be added infinitely.

In yet another embodiment, the PCR of the packets is modified by adding the time difference between when the time packet was sent, to the time of arrival, taking the difference between of PCR and OPCR into account.

Said above defined embodiments of the inventive method for receiving transport streams of data are implemented an executed in a device located at a receiver site.

The main characteristics and advantages of the invention are:

Deterministic placement of TS packets received from different input streams. The system is able to multiplex services from one or an unlimited number of input sources, and the resulting output packet sequence is fully predictable.

Deterministic PCR re-stamping of TS packets. Due to the change of TS bitrate when going from a satellite feed to a local SFN region, PCR re-stamping needs to be done. The outgoing video packets in an SFN region will have PCR jitter that is within the required limits (+/−500 ns).

"Smooth" multiplexing. Packets from inputs will be interleaved as smoothly as possible, keeping the introduced packet jitter at a minimum.

For DVB-T: Deterministic generation and insertion of MIP packets. Each MIP packet will be inserted with predictable, fixed interval producing DVB-T compliant streams.

For DVB-T2: Deterministic generation of super-frames, both on the super-frame level and the TS layer. Deterministic generation of DVB-T2 timestamp. Deterministic re-multiplexing of any number of Physical Layer Pipe, PLPs.

Different SFN regions may use different modulation parameters, thereby leading to different bit rates and different mega-frame/super-frame sizes. The invention can handle multiple modulation types; all different SFN regions may still be fed by the same main multiplex.

There is no need for any specific synchronization between different source multiplexers.

The invention handles NULL packet insertion (rate adaptation) at any stage between the main head end and the remote SFN site. This is important as many operators use DVB-S/S2 modulators configured with an independent output rate, and thereby performs NULL packet insertion and PCR re-stamping.

The following abbreviations will be used in the description:

DVB—Digital Video Broadcasting is the original standard for broadcasting via satellites.

ATS—Absolute Time Stamp. An absolute time stamp, associated with a TS packet at the MUX input determining the arrival time of the TS packet. An ATS is a specific representation of a TY2K time stamp. The value of the ATS is the number of 27 MHz cycles that has passed since Y2K. The deterministic re-multiplexing process described in this document operates on ATS values.

DTS—Departure Time stamp. An absolute time stamp, associated with a TS packet position determining the departure time of the TS packet at the MUX output. A DTS is a specific representation of a TY2K time stamp. The value of the DTS is the number of 27 MHz cycles that has passed since Y2K. The deterministic re-multiplexing process described in this document operates on DTS values.

ETT—Estimated Transmission Time. A configuration parameter in the DVB-T2 framing (gateway) process. Defines the number of milliseconds until a received packet shall be transmitted by a DVB-T/T2 modulator.

TAI—International Atomic Time (from French: "Temps Atomique International"). A monotonously increasing global time that forms the basis of UTC. This time increases monotonously over time. No correlation to changes in the earth's rotational speed. TAI is currently 34 seconds ahead of UTC. It is also the base time used in PTP—Precision Time Protocol (IEEE1588).

$T_{Y2K}$—See TMP specification. A time stamp, including sub-second information, that is based on counting number of seconds since Y2K, e.g. 2000-01-01 00:00:00 UTC. No leap seconds are added or removed to this time; it remains at a fixed offset compared to TAI. The DVB-T2 time stamp used in the T2MI interface is based on TY2K.

SFN—Single Frequency Network. A mode of operating DVB-T/DVB-T2 networks where all transmitters in an SFN region are synchronized and transmit exactly same signal.

TMP—Time Marker Packet containing metadata used for deterministic re multiplexing as described in this invention. A custom TS packet defined by this invention to insert timing information into transport streams. The TMP packet contains a APCR time stamp, consisting of both sub-second information and absolute time, PCR and OPCR. See TMP specification for details on the packet format.

UTC—Coordinated Universal Time. Primary standard time by which the world adjust clocks and time. UTC is adjusted with leap seconds when needed to keep the time in sync with the earth's rotation.

Y2K—Start of year 2000. Refers to 2000-01-01 00:00:00 UTC.

Epoch (reference date: 01.01.2000) serves as a reference point from which time is measured. Time measurement units are counted from the epoch so that the date and time of events can be specified unambiguously.

TS—Transport Stream.

MIP—Mega-frame Initialisation Packet.

MUX—The deterministic re-multiplexer as described in this invention.

1 PPS—a pulse per second (width of less than one second and a sharp pulse) and locked to UTC time base.

PCR—Program Clock Reference enables a decoder to present synchronized content, such as audio tracks matching the associated video as defined in Ref. [1]. The PCR in TMP packets is counting 27 MHz cycles since Y2K.

OPCR— Original Program Clock Reference as defined in Ref [1].

APCR—Absolute Program Clock Reference. APCR is a 27 MHz reference clock counting 27 MHz cycles since Y2K.

Null packets—Some transmission schemes, such as those in DVB, impose strict constant bitrate requirements on the transport stream. In order to ensure that the stream maintains a constant bitrate, a Multiplexer may need to insert some additional packets. The payload of null packets may not contain any data at all, and the receiver is expected to ignore its contents.

SFN time stamp—is used for stream synchronization and are specified in the respective SFN broadcasting standards, e.g. for DVB-T and T2 the following applies:

DVB-T: The SFN time stamp for is specified in Ref [6] as "synchronization_time_stamp" contained in the MIP packets.

DVB-T2: The SFN time stamp for is specified in Ref [3] paragraph section 5.7.2 as "DVB-T2 timestamp,"

SFN synchronization-frame—The SFN synchronization-frame is equivalent to the super-frames as defined in DVB T ref [5] and DVB-T2 ref [2].

FIG. 1 shows a system overview of the deterministic SFN re-multiplexing. The main parts of the system are a satellite broadcasting Head End and a terrestrial broadcasting network. The satellite broadcast system can be a normal Direct-To-Home (DTH) system or another type of distribution network such as commonly used to broadcast television by means of an MPEG-2 transport stream. This transport stream is adequately modulated with DVB S or S2 (1. and second 2. generation DVB) and received as digital TV by ordinary integrated TV or Set Top Boxes. The terrestrial network, in this case a DTT regional SFN network with a multiplex of local TV channels and national channels, and another regional SFN network with a different combination of local TV channels and national channels. Each region has multiple transmitters, and at each transmitter sites there is Deterministic SFN Re-multiplexer receiving the ordinary DTH signal and converting to DVB-T or T2-MI as required for operating in SFN mode.

The invention makes it possible to convert the DTH transport stream to a DVB-T signal with SFN Mega-frames or a DVB-T2-MI signal feeding a DVB-T or T2 transmitter. These transmitters operate in SFN mode meaning that the DVB-T and the T2-MI input signal to the transmitters must have identical time stamps, identical packet order and identical packet content.

It should be noted that the satellite broadcast signal cannot be directly converted to a DVB-T or T2-MI SFN signal. The reason for this is that the DTH satellite signal is configured for optimized use of the expensive satellite transponders. This results in bit rates in the range from 27 to 54 Mbit/s. A normal DVB T signal is in the range from 18 to 24 Mbit/s. This means that the bit rate needs to be reduced. A non-deterministic processing will result in differences in the output, for example with regard to null packets positions, and PCR values after re-stamping. Accordingly, the resulting DVB-T stream cannot be used for SFN operations. Even though the DVB-T2 support bit rate up to 45 Mbit/s, DVB T2 operation requires T2-MI interface for SFN mode, which is not supported by DTH receivers.

The invention may find its use in multiple scenarios:
- Distributing what is known as a FAT pipe signal containing a set of common channels and regional channels in one multiplex. The normal way to feed the transmitters in the individual regions would be to generate a dedicated DVB-T or T2-MI signal for each at the satellite head end and send each of them over satellite. This would be very inefficient and as the common content would need to be sent multiple times over satellite and the cost of such an operation be very high. Using the deterministic solution, the common channels are just sent once, and the operational cost is reduced to a minimum.
- Another application scenario is the use case shown in FIG. 1. Here the DTH broadcasting and the DTT distribution network is combined in a single transport stream which is more cost efficient than to build two separate networks. In some case the cost of building DTT distribution network over fibre or wireless radio links is too high and the combination of DTH broadcasting and DTT feed network make it possible to build a DTT network.
- A 3rd scenario is to use an existing satellite or terrestrial network to feed gap fillers to provide a DVB-T or DVB-T2 to receivers located in shadow areas.

The system in FIG. 1 shows that the main feed and the feed with regional services are generated at the same location, but this is of course not a requirement. The transmitter with the Deterministic re-multiplexer should be located so that it can receive the transport stream and point its antenna to the intended coverage area. In city areas with a lot of high raised building and also elsewhere several such transmitters may operate in SFN mode.

The tasks of the deterministic re-multiplexer of the invention are:
- Re-multiplexing of the input transport stream in a deterministic manner in such a way that multiple units that receive the same inputs generate identical output transport streams.
- Insertion of transport stream packets generated locally. These data packets may contain additional video/audio, EPG data or other content. Multiple units inserting these additional packets, shall also build identical transport streams.
- Deterministic construction of a DVB-T mega-frame or a T2_MI signal with synchronized SFN time stamps.

The multiplexers at the main head end are referenced to with absolute time—TAI. This may be accomplished by a 1 PPS signal together with Network Time Protocol (NTP) server access. Alternatively, it may be implemented using Precision Time Protocol (IEEE1588) Ref [8]. For each multiplex that is going to participate in the re-multiplexing process, TMP packets are inserted into the outgoing multiplex. The frequency of these packets may be configured freely. A normal setting would be to send the packets more often than each 40 ms to avoid PCR interval errors.

Processing at the Main Site.

The following will describe method performed at the main site, i.e. the head end. The content in the TMP packets are not tailored towards a specific configuration for the DVB-T/DVB-T2 transmission but will support all operational modes possible in the DVB T or T2 standard and also other MPEG based SFN broadcasting standards as for example ISDB-T. The content is included in the TMP packets—are simply used to calculate time stamps. Note that the very same TMP packets may be used to generate a DVB-T mega-frame in one regional and a T2-MI signal in another regions novel compared to previous solutions as for example the PCT/EP2011/053091.

The TMP packets contain an absolute time stamp, APCR, that are needed in the re-multiplex process in the regions. In addition, the TMP contains a normal MPEG-2 Program Clock Reference PCR, Original Program Clock Reference, OPCR and the current number of leap seconds since Epoch. The APCR and PCR are counting number of 27 MHz cycles since Y2K and are locked to 1 PPS clock reference. The value of OPCR is a copy of PCR. The source transport stream may be passed through multiple units such as a head end multiplexer where the TMP packets are inserted into the DTH broadcast signal or a satellite modulator with rate adaption. Such processing will also involve re-stamping of PCR to compensate for packet delay. Ref [1] MPEG-2 Systems.

As input to the multiplexers, PSI/SI to be used in the SFN region is also inserted, Ref [1] and [7]. The tables will typically re-mapped to a set of custom PIDs, not seen by DTH receivers. In each region, these components are remapped back to the normal PSI/SI PID values. PSI/SI is typically regenerated based on a service selection process. The invention also makes it possible to insert additional transport stream packets. These packets may be SI packets sent from an internal SI processor module.

The TMP inserters in FIG. 1 are depicted as internal modules in the main multiplexer. However, since the timing insertion tolerates rate change after TMP packet insertion, the function may well be located in an external multiplexer before the main multiplexer.

Deterministic Re-Multiplexers at the Transmitter Site.

FIG. 1 shows two regions, each with multiple transmitters operating in SFN mode. At each transmitter site there is a deterministic re-multiplexer that receives one or more input transport streams. Each re-multiplexer will build frames of output data in a deterministic manner that will be bit-by-bit equal for all units with the same configuration. The multiplex process does not have any restrictions with regard to which services and components to be stopped or passed on the SFN output transport stream except the rate limitation of the SFN configuration. (DVB-T Mega-frame and/or T2-MI).

The process can be seen as comprising two stages:

Re-multiplexing of the transport streams. In this process, incoming packets are selected, PID remapped, PCR re-stamped and inserted into a new, regenerated transport stream.

Adapting the transport streams to the currently configured output. For DVB-T, this is simply to send the output TS with the correct bitrate. For DVB-T2, this means adapting the transport streams to one or more outgoing PLPs.

The following needs to be configured per multiplexer:
The inputs to be enabled.
For each input, the PID of the TMP packets that will be used for time stamping
The PID filtering and remapping rules. This includes:
  Routing of the selected components to be forwarded in the regional SFN multiplex
  Remapping and forwarding of the centrally generated PSI/SI tables
The output configuration. This includes all details normally found in an ordinary DVB-T SFN adapter or a DVB-T2 gateway. Examples are:
Number of carriers
Error protection
Guard interval
Number of PLPs (DVB-T2 only)
Additional information as for example the transmitter configuration content in the DVB-T MIP packet and corresponding data for the T2-MI transport stream.

Each remote re-multiplexer in the same SFN region needs to use identical configurations in order to produce identical output streams.

The configuration can be performed in the normal way by remote control for example by means of http or with in-band signalling messages addressed to a set of re-multiplexers in a region can be inserted into the satellite multiplex, making it easy to manage a set of re-multiplexers synchronously by means of the APCR from a central location.

In the following, details of the TMP packets will be described. A TMP packet is a special TS packet that contains time information to be used in the re-multiplexing process.

Figure 2:
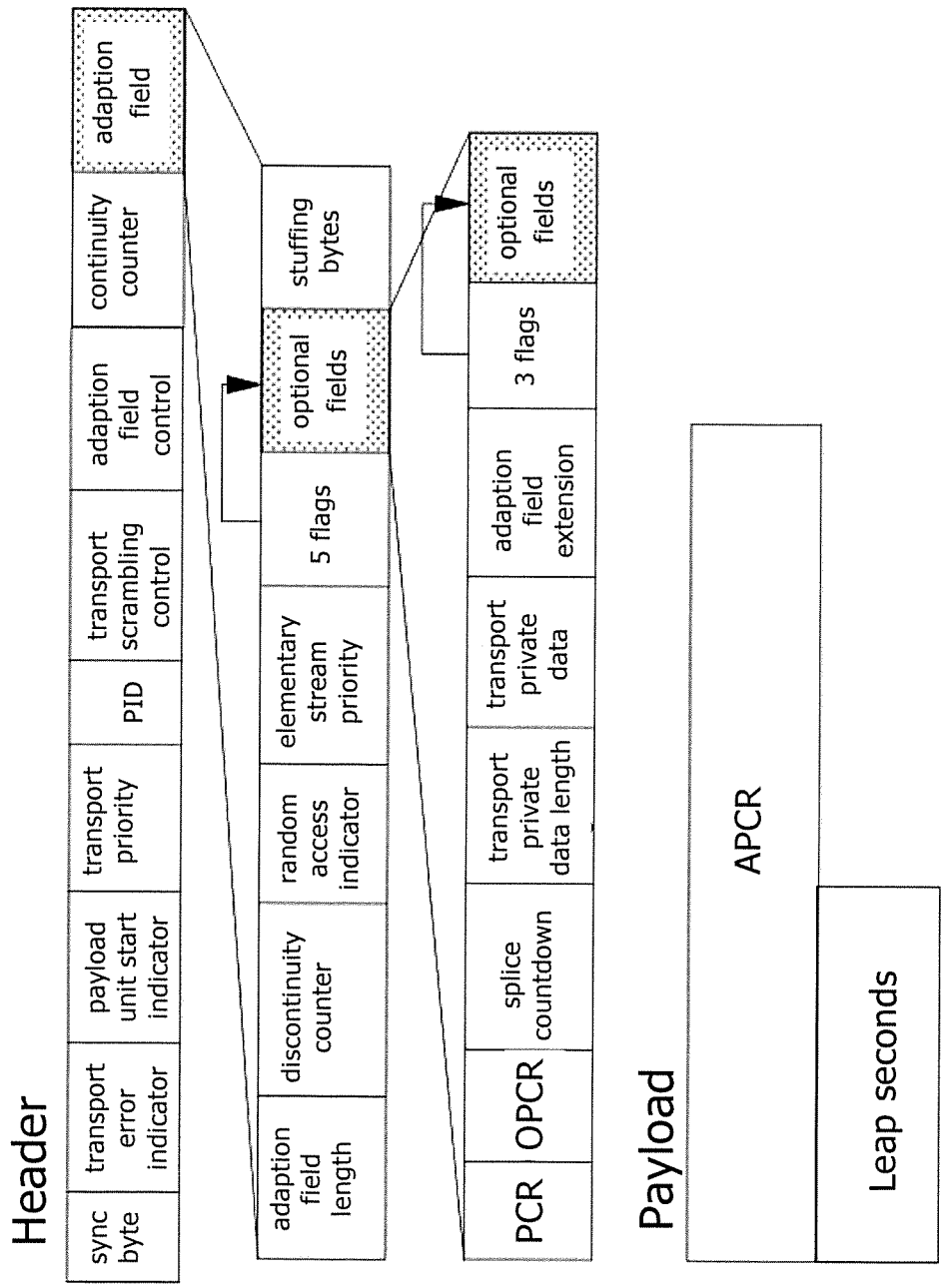
FIG. 2 shows various components present in a TMP packet.

FIG. 2 shows a detailed description of the various components present in the TMP packet. The TMP packet uses the normal MPEG-2 Systems TS packet syntax. The packet header is extended and includes PCR and OPCR. The APCR and leap second fields are inserted as packet payload.

TMP packets contain a $T_{Y2K}$ timestamp, using two different resolutions (1 Hz and 27 MHz) for the sub-second information, each 32 bits. The APCR counter will increment and not wrap around before in year 2136 giving a sufficient range to avoid incorrect time decisions.

Figure 3:
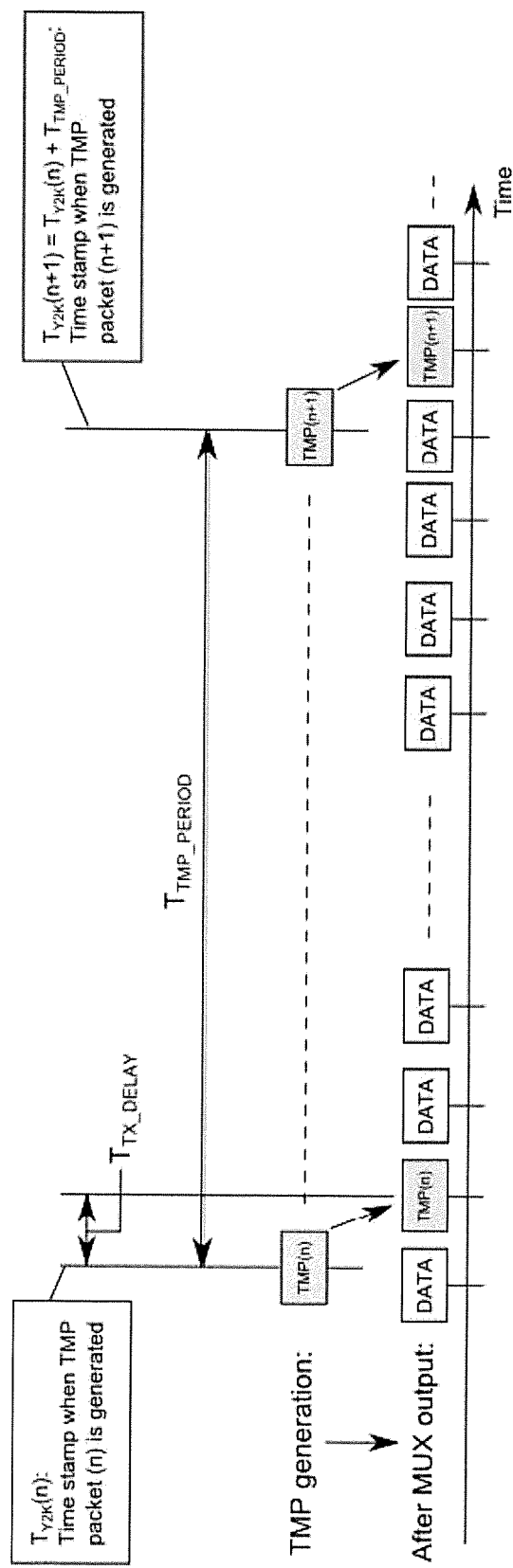
FIG. 3 shows the consequence of a re-multiplexing process between the TMP packet generator and the deterministic re-multiplexer.

FIG. 3 illustrates the consequence of a re-multiplexing process between the TMP packet generator and the deterministic re-multiplexer. $T_{Y2K(n)}$ denotes the ideal transmission time for TMP(n). However, due to the multiplexing process it is not possible to send the packet directly at that time. A delay, $T_{TX\_DELAY}$, is introduced before the packet leaves the multiplexer. TMP packets utilize the PCR and OPCR field to handle this delay.

The TMP packets allow a deterministic absolute timestamp—ATS—to be calculated for all TS packets in the same stream. These timestamps are used in the multiplexing process. A full ATS represents an absolute time stamp, indicating the number of 27 MHz cycles since 2000-01-01 00:00:00. The calculation of this time stamp is described in detail in the TMP specification.

Figure 4:
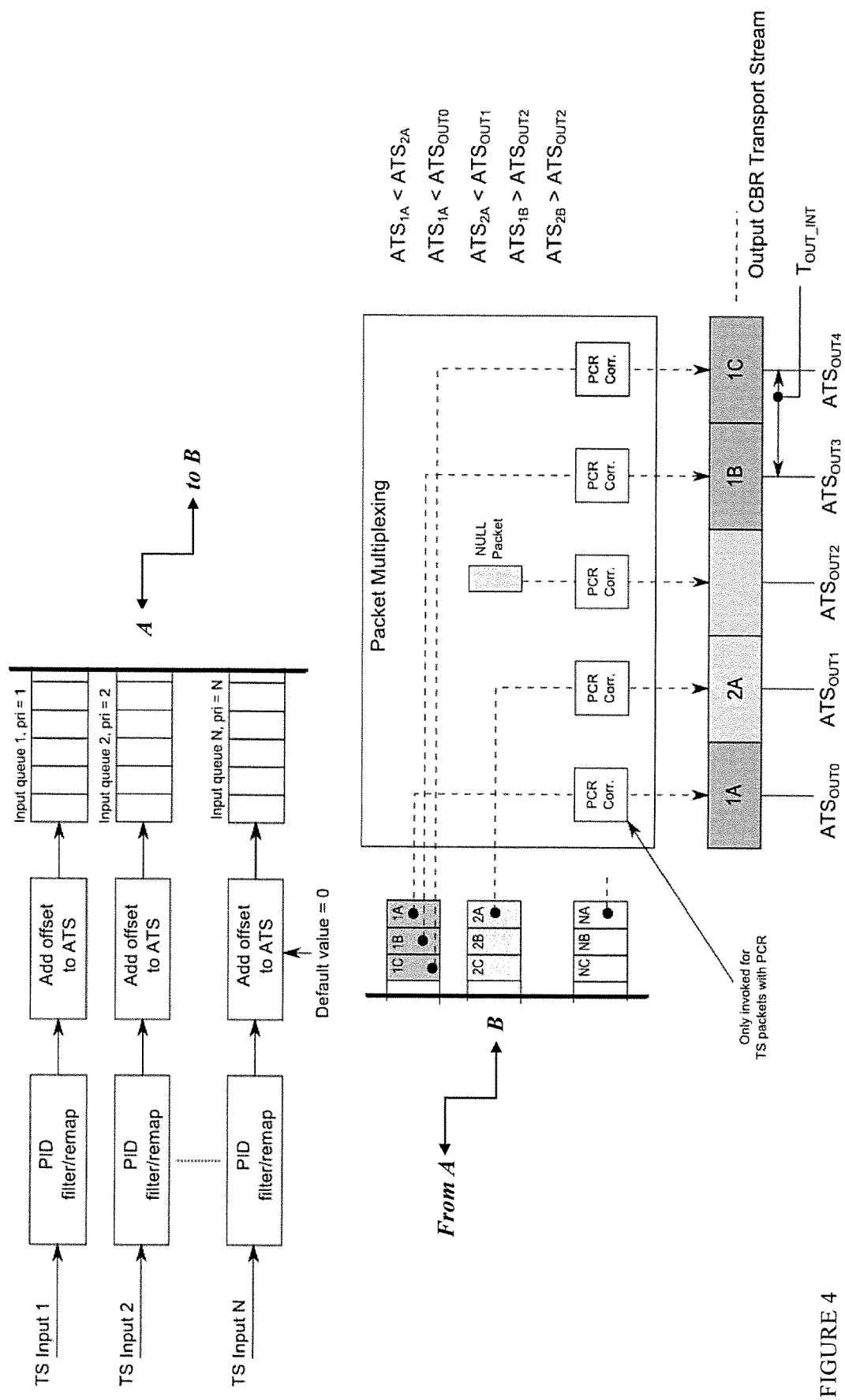
FIG. 4 shows the PID filter/remapping operation.

FIG. 4 shows the process for generating SFN Time Stamps. The same procedure is used for DVB T and T2. The deterministic re-multiplexer uses the ACPR to find the current time since Y2K. The frame length for a DVB-T Mega-frame and T2 Frame is given by the configuration. The basis for calculating the SFN Time stamp for next frame is based on principle that the time stamp for first SFN-frame was 1.1. 2000 at 00:00:00 UTC. By using the current value for APCR and the SFN-frame length, the calculation of next and future time is straightforward as shown in FIG. 4.

A constant bitrate output is defined for the multiplexing process. The output bitrate is locked to the same clock that is used as base for the TY2K time stamps. An output ATS time is calculated for each TS packet in the outgoing transport stream. The time is calculated based on the following assumptions:

The first packet in the outgoing multiplex was transmitted at the Y2K point in time, e.g. 2000-01-01 00:00:00 UTC.

As shown in FIG. 4, the time interval $T_{OUT\_INT}$ between each packet is constant and is established from the configured bitrate.

For a packet at offset N since Y2K, the departure time stamp $DTS_{OUT(N)}$ becomes:

$$DTS_{OUT(N)} = N * T_{OUT\_INT}$$

Figure 5:
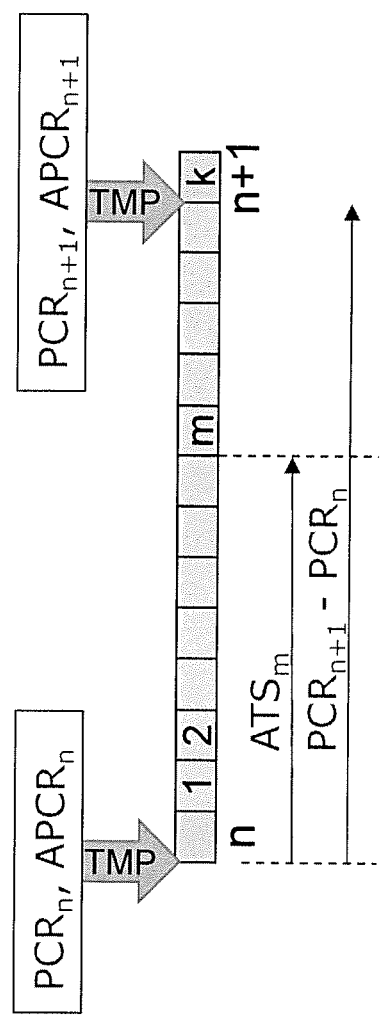
FIG. 5 shows calculation of an ATS value.

For each input, a PID filter/remapping operation is done. All packets that are to be transmitted are placed in a separate queue for each input. All input packets to be multiplexed have an associated ATS value which is calculated as shown in FIG. 5. Before multiplexing is done, an offset (configurable) is added to the ATS value for each incoming TS packet.

At start-up, all outgoing packet slots from Y2K until the lowest incoming ATS value are discarded. At the first slot where the output time stamp is larger than the lowest input ATS value, multiplexing starts.

For every outgoing packet position and the succeeding, the calculated output DTS time $DTS_{OUT(N)}$ is compared to the ATS values for each input queue, as illustrated in FIG. 4.

Each input ATS value is compared to the DTS value for the output packet slot. If all input ATS values are larger than the DTS value of the current output slot, a NULL packet is inserted.

If only one of the inputs has a packet with an ATS value lower than the output DTS value, this packet is inserted into the output packet slot.

If more than one of the inputs have packets with ATS values lower than the current output slot, the packet with the lowest ATS value is selected and is inserted first.

If two input packets get exactly the same ATS value, the packet from the highest priority input wins.

In case of temporary buffer increase due to bursts in the incoming TS packet rate for a PID, the multiplexer may experience that a backlog of packets is building up. E.g. the difference between $DTS_{OUT(N)}$ and $ATS_{INPUT(M)}$ increases temporarily. The multiplexer will accept a difference given by a time TBACKLOG. If the difference exceeds TBACKLOG, the TS packet is dropped.

The process is fully deterministic and will lead to the same packet sequence output of a plurality of independent re-multiplexers.

The generated TS packets in the output CBR stream needs to be drained continuously and forwarded to an output module.

A PCR re-stamping process will now be described. When PCR packets are to be inserted into the outgoing multiplex, the packet position will be shifted due to the change of rate. If the packets contain PCR fields, the re-multiplexer needs to perform PCR adjustments.

This process is straight forward as the times needed are available from the ATS values, which are also using 27 MHz clock cycles as unit.

If for instance a packet with input ATS $ATS_{INPUT}$ is to be inserted into an output packet slot with DTS value $DTS_{OUT}$ the PCR re-stamping process will simply follow the normal approach:

$$PCR_{OUT} = PCR_{IN} + DTS_{OUT} - ATS_{INPUT}$$

In the following it is described how the deterministic re-multiplexing can be used in DVB-T SFN networks.

For DVB-T, the transport stream to be fed to the modulators is divided into so-called mega-frames. A mega-frame consists of a fixed number of packets. The start of a mega-frame, at any point in time, can be derived from Y2K assuming that the first mega-frame was transmitted at Y2K.

The multiplexing process will follow the basic principles as previously described. Some output TS packet slots will correspond to the first packet in a DVB-T mega-frame. In this packet slot, a MIP packet will be inserted before any other TS packet. The sts_offset field in the MIP packet is derived directly from the ATS time stamp for the following mega-frame.

The following will describe how to map to DVB-T2 super-frames. This is based on the same fundamental concept as for DVB-T. It is assumed that the first DVB-T2 super-frame was generated at Y2K—the start and end time of each following super-frame can be derived from this fact.

It is assumed that for each PLP in a DVB-T2 super-frame, there will be a fixed number of TS packets. It is theoretically possible to have fractional TS packets, but this is outside the scope of this disclosure.

The DVB-T2 timestamp to be used in a DVB-T2 super-frame is derived directly from the ATS value of the first output TS packet in a super-frame. An ETT time is added to the DVB-T2 timestamp at super-frame generation. The time must be large enough to tolerate the total delay in the network, including the re-multiplexing process.

For single PLP operation, the operation is straightforward. The re-multiplexer keeps track of the start and end times for each super-frame in the output.

For multi PLP mode, there are several output transport streams that need to be generated. In independent mode, each output TS are seen as completely independent, except that the first TS packet in each outgoing super-frame has the same ATS value. This is a result from the requirement that there must be a fixed number of TS packets in a DVB-T2 super-frame.

In independent mode, each outgoing PLP is treated as a separate transport stream, with its own unique bitrate. For each output, there is a PID remap/filter table. The output streams are built independent of each other.

In synchronous mode, each outgoing PLP has the same bitrate. Synchronous mode uses the null packet deletion mechanism in DVB-T2 to reduce the outgoing bitrate. Synchronous mode also allows insertion of a so-called common PLP. Common components for all PLPs in the group may be shared between the different data PLPs in the same group.

In synchronous mode, there is only one multiplexing process, even if there are multiple outputs. For each packet to be multiplexed from an input there is one, and only one destination output PLP. All other PLPs receive a NULL packet. This means that each incoming PID is tagged with a destination PLP.

Common components for all PLPs can be inserted into one common PLP.

Figure 8:
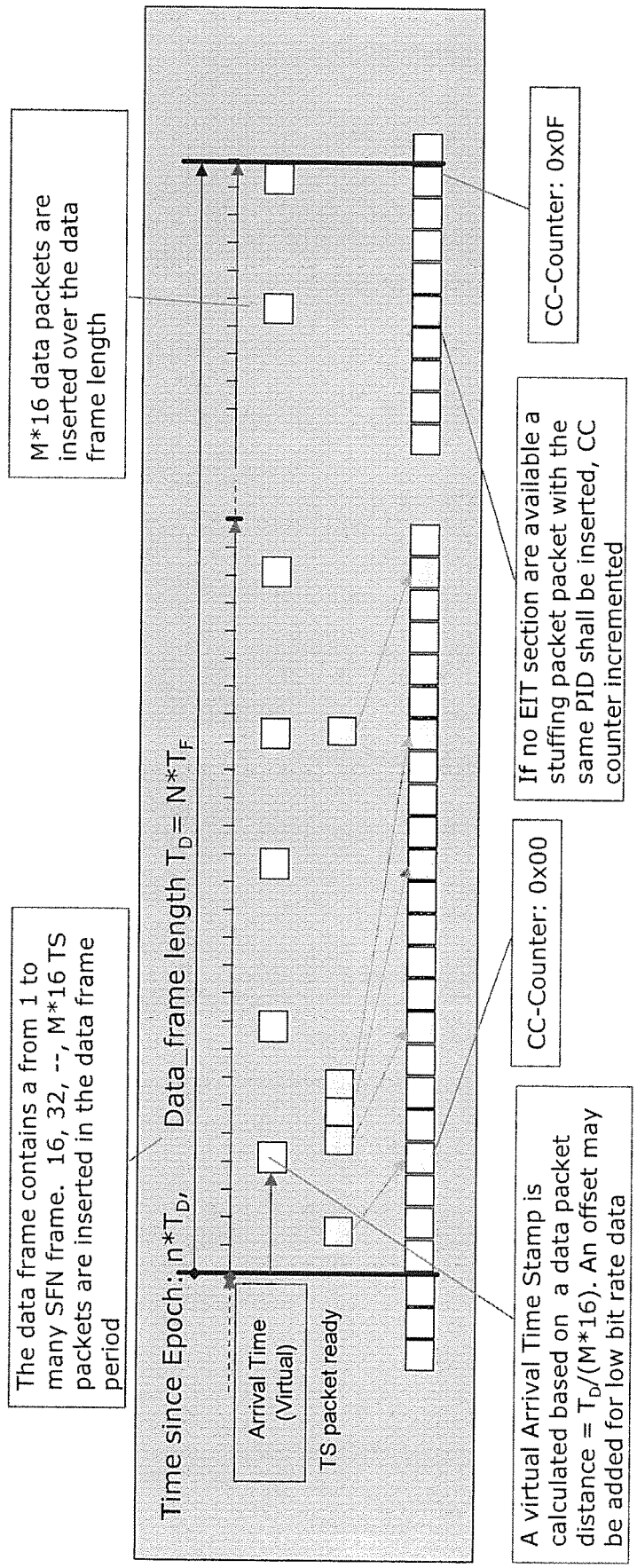
FIG. 8 shows data packet insertion with virtual arrival times.

FIG. 8 shows one embodiment of the invention with data packet insertion with virtual arrival times.

A present transport stream for digital television may carry TS packets data other than video and audio packets. This data may be generated by multiple sources such as:
  DSM-CC stream generators
  Local carousel for EIT
  Stored video/audio content
  Local advertisements content
  Emergency Warning System data The insertion of such type of data must be performed by strict control of rate in order to avoid overflow and the insertion must also be controlled such that the 4-bit cc-counter in each TS packet is incrementing correctly. The method for handling this is included as one embodiment in the present invention. The method includes the following:

Determine a data insertion period with a duration of $N*T_F$

For data sent with constant bit rate is the position of the data insertion period is an integer number of $N*T_F$ from the Epoch.

For data sent over a shorter period can start and stop time be set referencing the APCR clock Determine the number of TS packets to be sent over the data insertion period.$=M*16$. The bit rate for data stream is then $M*16/N*TF$ packets per second. M and N are integer numbers and user configurable to fit the bit rate of the data stream.

The mechanism for generating data packets are deterministic and synchronized to APCR clock in such a way that multiple deterministic re-multiplexer generates identical packets at the same time. The value of the cc-counter for first data packet in the data insertion period shall be 0.

Figure 6:
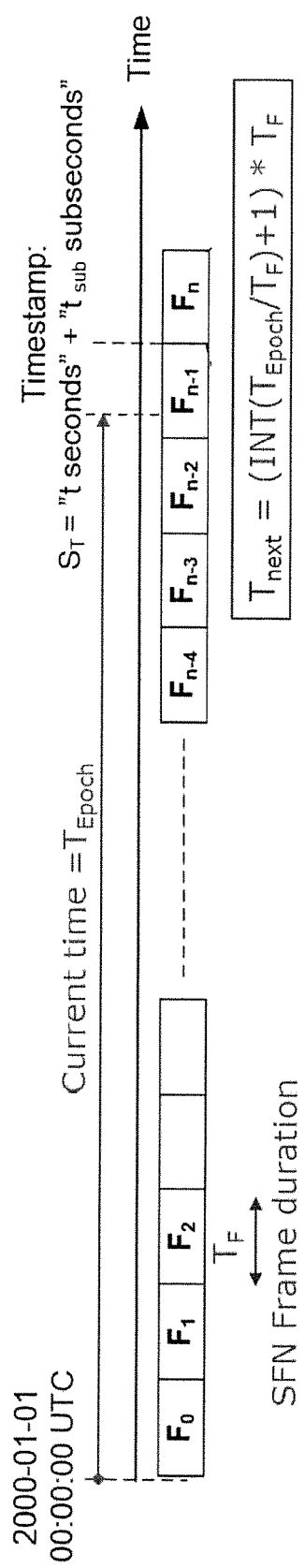
FIG. 6 shows calculation of SFN time stamps.
Figure 7:
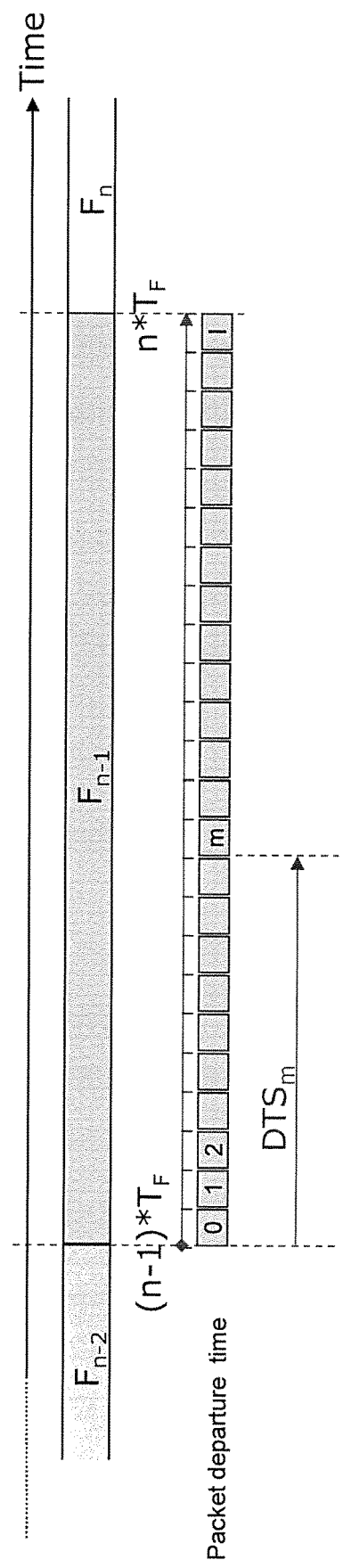
FIG. 7 shows calculation of departure time stamp, DTS.

The data packet is multiplexed into the output transport stream as explained in FIG. 6. Each packet is tagged with an Arrival Time Stamp which is not derived from the time the packet was created but with a time stamp that gives a constant rate. The arrival time stamp, $ATS_j$, for packet number j ($0 \leq j \leq M*16$) for continuous data insertion:

$$ATS_j = (\text{integer})*N*T_F + j*N*TF/M*16 + \text{Offset}$$

"Integer" is the number of data_insertion frames since Epoch, and Offset is a configurable offset that enables a more precise control for packet positioning.

The same rule is used for data that is inserted over a period.

The invention requires devices located at a transmitting site and receiving site for executing the method according to the invention. These devices are thus installed at both the main head-end and regional head-ends. The examples presented in this description assume that a satellite system is used as the distribution method between the main head end and the SFN regions. The described system will however work well with other distribution systems.

The invention claimed is:

1. A method for adding Time Marker Packets, TMPs, comprising Metadata to a Moving Picture Experts Group-2, MPEG-2, transport stream transmitted via a broadcast network for providing a deterministic transport stream, comprising:

providing feeds of data from at least one source, where the feeds comprise payload packets being referenced by a common One Pulse Per Second, 1 PPS, reference, and where the feeds are input to at least one multiplexer, MUX;

providing Time Marker Packets, TMPs, as input to each multiplexer, where each TMP comprises a plurality of time stamps per second measured relative to said 1 PPS reference, and each TMP includes an Absolute Program Clock Reference, APCR, timestamp generated at the time of transmission based on an Epoch time, and where the TMP packet further comprises Program Clock Reference, PCR, Original Program Clock Reference, OPCR, locked to said 1 PPS and Coordinated Universal Time, UTC, leap seconds;

providing a MUX configuration data enabling the MUX to determine a length of a Single Frequency Network-frame, SFN-frame, by remote control of re-multiplexers in a region.

2. The method according to claim 1, where the APCR uses a 27 MHz clock for program clock reference.

3. The method according to claim 1, where the APCR uses the PCR 27 MHz clock for program clock reference, and the PCR is locked to 1 PPS with Epoch Y2K (start of year 2000).

4. The method according to claim 1, where said TMP is sent between 20 to 40 times per second.

5. A device for adding Time Marker Packets, TMPs, comprising Metadata to an MPEG-2 transport stream transmitted via a broadcast network for providing a deterministic transport stream, where said device is connected to a transmitter and comprises means for performing the method according to claim 1.

6. A method for coding a deterministic transport stream in a Single Frequency Network, SFN, comprising:

receiving at least one multiplexed transport stream comprising TMP packets on input of a deterministic re-multiplexer, where each TMP comprises a plurality of time stamps per second measured relative to One Pulse Per Second, 1 PPS, reference, and each TMP has a value representing an Absolute Program Clock Reference, APCR, at the time of transmission, where the APCR is based on an Epoch time, and where the TMP packet further comprises Program Clock Reference, PCR, Original Program Clock Reference, OPCR, locked to said 1 PPS, Estimated Transmission Time, ETT, and Coordinated Universal Time, UTC, leap seconds;

receiving MUX configuration data enabling the MUX to calculate a length of the SFN-frame;

extracting timing information from each TMP and deterministically generating SFN Time stamps, based on UTC, the length of an SFN-frame, Estimated Transmission Time and using the Absolute Program Clock Reference, APCR, as a time base for calculation of the departure time of the first packet in the SFN-Frame;

tagging each packet slot in the SFN-frame with a departure time stamp, DTS, based on a position of each packet slot in the SFN-frame;

tagging each received packet with an arrival time stamp, ATS, based on a position of each received packet relative to the APCR packet arrived before and after each packet, and producing compliant and fully deterministic output streams of data with payload packets for SFN modulators by selecting packets from at least one multiplexed transport stream received, and where the selected packets are placed in order from low to high ATS, where the position of data packets in a mega-frame is calculated based on incremental increase from the first data packet in the mega-frame, and where a null packet is inserted in an output packet position if there are no packets for which the arrival time stamp is less the departure time stamp for that position.

7. The method according to claim 6, where for a Digital Video Broadcasting—Terrestrial, DVB-T, system, letting each said multiplexer generate Mega-frames with the payload packets, where each Mega-frame comprises a Mega-frame Initialization Packet content, MIP, based on the duration of each SFN-frame, UTC (APCR), Estimated Transmission Time, ETT, and said TMP.

8. The method according to claim 6, where for a Digital Video Broadcasting—Terrestrial2, DVB-T2 system, letting each said multiplexer generate DVB-T2 time stamp content, based on the duration of each T2-frame and the TMP comprising UTC (APCR), Estimated Transmission Time, ETT, and said TMP.

9. The method according to claim 6, where additional packets are inserted in the output transport stream over a period of time, and where these packets are coming from other sources and where the arrival time of these packets are generated in such a way that the number of packets is an integer number of 16 packets, and where the start and stop time of the period is referenced to the APCR clock and where multiple periods of same duration may be added infinitely.

10. The method according to claim 6, where the PCR of the packets is modified by adding the time difference between when the time packet was sent, to the time of arrival, taking the difference between of PCR and OPCR into account.

11. A device for coding a deterministic transport stream in a Single Frequency Network, SFN, where said device is connected to a receiver and comprises means for performing the method according to claim 6.

* * * * *